(12) United States Patent
Hubrich et al.

(10) Patent No.: US 7,852,937 B2
(45) Date of Patent: Dec. 14, 2010

(54) MOTION VECTOR ESTIMATION EMPLOYING LINE AND COLUMN VECTORS

(75) Inventors: Ralf Hubrich, Weiterstadt-Gräfenhausen (DE); Michael Eckhardt, Wiesbaden (DE)

(73) Assignee: Panasonic Corporation, Osaka (JP)

( * ) Notice: Subject to any disclaimer, the term of this patent is extended or adjusted under 35 U.S.C. 154(b) by 1246 days.

(21) Appl. No.: 11/076,854

(22) Filed: Mar. 11, 2005

(65) Prior Publication Data

US 2005/0243928 A1 Nov. 3, 2005

(30) Foreign Application Priority Data

Mar. 30, 2004 (EP) .................................. 04007696

(51) Int. Cl.
*H04N 7/12* (2006.01)
(52) U.S. Cl. ................................. 375/240.16
(58) Field of Classification Search ............. 375/240.16
See application file for complete search history.

(56) References Cited

U.S. PATENT DOCUMENTS

| | | | | | |
|---|---|---|---|---|---|
| 5,712,474 | A | * | 1/1998 | Naneda ................... | 250/208.1 |
| 5,731,832 | A | * | 3/1998 | Ng .............................. | 348/155 |
| 6,160,917 | A | * | 12/2000 | Sommer ..................... | 382/236 |
| 6,201,896 | B1 | * | 3/2001 | Ishikawa .................... | 382/236 |
| 6,285,711 | B1 | * | 9/2001 | Ratakonda et al. ..... | 375/240.16 |
| 6,336,050 | B1 | * | 1/2002 | Amin et al. .................. | 700/28 |
| 2003/0067985 | A1 | | 4/2003 | Nagasaki | |
| 2004/0179604 | A1 | * | 9/2004 | Tee et al. ............... | 375/240.16 |

FOREIGN PATENT DOCUMENTS

WO 00/70879 11/2000

OTHER PUBLICATIONS

Aleksandar Beric et al., "A Technique for Reducing Complexity of Recursive Motion Estimation Algorithms", IEEE Workshop on Signal Processing Systems, SIPS. Design and Implementation, XX, XX, Aug. 17, 2003, pp. 195-2000, XP010661014.
Gerard de Haan et al., "An Efficient True-Motion Estimator Using Candidate Vectors from a parametric Motion Model", IEEE Transactions on Circuits and Systems for Video Technology, IEEE Inc. New York, US, vol. 8, No. 1, Feb. 1, 1998, pp. 85-91, XP000737028, ISSN: 1051-8215.
Office Action issued on Jan. 21, 2009 for U.S. Appl. No. 11/081,583.

* cited by examiner

*Primary Examiner*—Y. Lee
*Assistant Examiner*—Richard Torrente
(74) *Attorney, Agent, or Firm*—Wenderoth, Lind & Ponack, L.L.P.

(57) ABSTRACT

The present invention provides an improved method for motion estimation. As an additional candidate vector to be selected during motion estimation, a line or column vector is calculated representing predominant motion in a respective line or column of blocks of a video image. Such a line and column motion vector enables a more accurate determination of motion of larger image objects and a correspondingly improved interpolation in television receivers or video encoders.

40 Claims, 5 Drawing Sheets

The End

Figure 1:
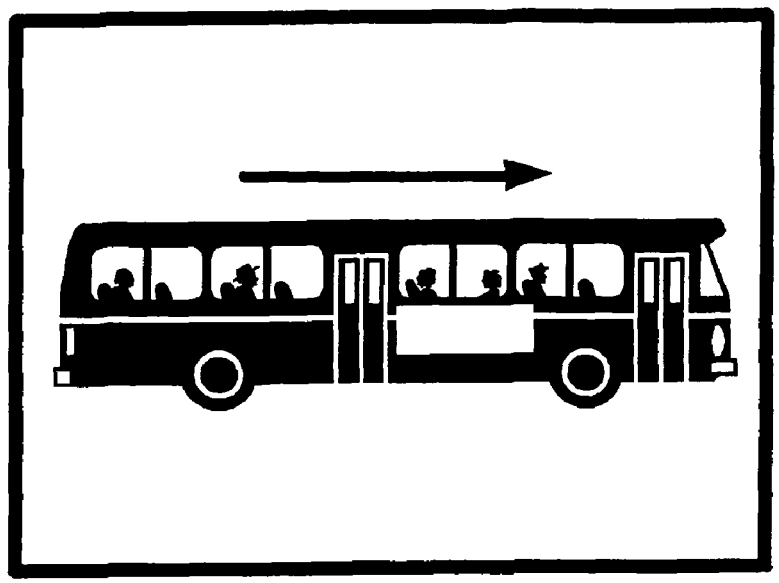

Starring:
vertical vector
moving credits
no global motion
motion estimation
motion compensation
framerate conversion

MOTION VECTOR ESTIMATION EMPLOYING LINE AND COLUMN VECTORS

The present invention relates to an improved motion estimation. In particular, the present invention relates to a method for estimation of a motion vector between blocks of images in a video sequence and a corresponding motion estimator.

Motion estimation is employed in an increasing number of applications, in particular, in digital signal processing of modern television receivers. Specifically, modern television receivers perform a frame-rate conversion, especially in form of a up-conversion or motion compensated up-conversion, for increasing the picture quality of the reproduced images. Motion compensated up-conversion is performed, for instance, for video sequences having a field or frame frequency of 50 Hz to higher frequencies like 60 Hz, 66.67 Hz, 75 Hz, 100 Hz etc. While a 50 Hz input signal frequency mainly apply to television signals broadcast based on PAL or SECAM standard, NTSC based video signals have an input frequency of 60 Hz. A 60 Hz input video signal may be up-converted to higher frequencies like 72 Hz, 80 Hz, 90 Hz, 120 Hz etc.

During up-conversion, intermediate images are to be generated which reflect the video content at positions in time which are not represented by the 50 Hz or 60 Hz input video sequence. For this purpose, the motion of moving objects has to be taken into account in order to appropriately reflect the changes between subsequent images caused by the motion of objects. The motion of objects is calculated on a block basis, and motion compensation is performed based on the relative position in time of the newly generated image between the previous and subsequent images.

For motion vector determination, each image is divided into a plurality of blocks. Each block is subjected to motion estimation in order to detect a shift of an object from the previous image. A time consuming full search algorithm for detecting a best match block in the previous image within a predefined search range is preferably avoided by employing a plurality of predefined candidate vectors. The set of candidate vectors includes a number of predefined most likely motion vectors.

A motion vector is selected from the candidate vectors based on an error value calculated for each of the candidate vectors. This error function assesses the degree of conformity between the current block and the candidate block in the previous image selected in accordance with the respective candidate vector. The best matching vector having the smallest error function is selected as the motion vector of the current block. As a measure for the degree of similarity between the current and the previous block, the Sum of Absolute Differences (SAD) may be employed.

The set of predefined candidate vectors may include those motion vectors as candidate vectors which have already been determined for adjacent blocks of the current image, motion vectors which have been determined for blocks in the previous image at a similar position, etc.

The Article "An Efficient True-Motion Estimator Using Candidate Vectors from a Parametric Motion Model" from Gerard de Haan et al. in IEEE Transactions on Circuits and Systems for Video Technology, vol. 8, no. 1, February 1998, describes the calculation of a global motion vector as a candidate vector. The global motion vector reflects a common motion of all blocks of the image.

EP-A-0 578 290 describes further candidate vectors which are based on the motion vectors of adjacent blocks of the current image. The length and direction of these vectors is modified by adding an update vector having a random magnitude. The selection of these type of vectors as motion vector of the current block can be controlled by adding predefined penalty values to the respective SAD. In accordance with the added penalty, the likelihood to be selected as the motion vector of the current block can be respectively reduced.

In addition to image interpolation, motion estimation is further employed during the encoding of video images in order to exploit temporal redundancies. For this purpose, a plurality of video encoding standards has been developed. In wide-spread use are the encoding standards denoted as H.26x or MPEG-x.

The present invention aims to further improve motion estimation and to provide an improved method for determining a motion vector and an improved motion estimator.

This is achieved by the features of the independent claims.

According to a first aspect of the present invention, a method for determining a motion vector for a block of a current image in a sequence of video images is provided. Each video image is divided into a plurality of blocks. A motion vector is determined for all blocks of a line or column of blocks in a previous image of the sequence of video images. The line or column of blocks include a block located at a position corresponding to the position of the current block in the current image. The determined line or column motion vector is assigned to the current block.

According to a further aspect of the present invention, a motion estimator is provided for determining a motion vector for a block of a current image in a sequence of video images. Each video image is divided into a plurality of blocks. A calculation unit determines a motion vector for all blocks of a line or column of blocks in a previous image of the sequence of video images. The line or column of blocks includes a block which is located at a position corresponding to the position of the current block in the current image. A selector assigns the determined line or a column motion vector to the current block.

It is the particular aspect of the present invention to provide a candidate vector for the motion estimation which reflects the predominant motion of a line or a column of blocks in a video image. Such a motion vector can appropriately detect motion of larger objects which do not apply to the entire image and, thus, cannot be represented by a global motion vector. By employing all blocks of a line or column of a previous image, the predominant line or column motion can be accurately estimated.

Preferably, only those motion vectors from the previous image are taken into account for determining a line or column motion vector which exceed a predefined threshold value. Consequently, a random like distribution of rather small motion vectors is efficiently eliminated and not taken into account for the line or column motion vector determination.

The threshold value which is preferably employed for this purpose corresponds to a motion vector length of ⅓ to ⅔ of the respective block length in the line or column direction, most preferably to a length of essentially one half of the respective block length.

The threshold value is preferably set to a value larger or equal to two, preferably four pixels, irrespective of the employed block size. Preferably, the threshold value is not set larger than eight pixels. Unreliable vectors can consequently efficiently eliminated from the line or column vector calculation.

According to a preferred embodiment, a line or a column motion vector is only determined if a predefined number of block motion vectors of the respective line or column of the previous image exceed the predefined threshold value. This ensures that the line or column motion vector can be reliably detected. In particular, a motion vector calculation based only on a small proportion of the blocks of a complete line or column is effectively prevented.

Preferably, the minimum number of blocks required for a line or column motion vector calculation corresponds to a value between ¼ and ¾ of the maximum number of blocks per line or column, most preferably to essentially the half of the maximum number of blocks per line or column. For an image in accordance with PAL standard and a block width of eight pixels, a minimum number of forty-five motion vectors has then to be taken into account for a block line motion vector. For a PAL standard image and a block height of eight pixels, a minimum value of thirty-six motion vectors is required for a block column vector.

Preferably, the predefined threshold values are set differently for a line motion vector and a column motion vector.

According to a preferred embodiment, the motion estimation is performed based on a plurality of candidate vectors including said line or column motion vector for determining a best match motion vector for the current block. Based on a limited set of motion vectors each of which providing a motion estimation, a motion vector determination can be performed with reliable results only employing a minimum hardware effort and a minimum number of required computations.

In order to reliably detect a possible motion in a line or column direction, both respective motion vectors are included into the set of candidate vectors.

In contrast to a full search approach for determining a motion vector, the motion estimation is preferably based on candidate vectors including at least one from a zero motion vector pointing to the identical block position of the current block, a motion vector which is determined for an adjacent block of the current image wherein the length of the vector is varied by an update vector, and a motion vector which has been determined for a block of the previous image. Such a limited set of motion vectors enables a fast and reliable motion vector determination.

Preferably, the adjacent block of the current image is a block of the same column or line of the current block.

Preferably, the update vector adds an offset value to a calculated motion vector wherein the offset values being a fixed set of offset values or, alternatively, random or pseudo-random values. Thus, small changes in the motion from the motion of candidate vector with respect to the current block can be efficiently taken into account.

Preferably, the line or column motion vector calculation is based on two adjacent lines or columns of motion vectors from the previous image. In this manner, a large area motion can reliably be detected and/or the computational effort for a line/column vector determination reduced as a number of motion vectors to be calculated per image is considerably reduced. In the same manner, more than two, for instance three, four or five lines or columns, may be combined for calculating a single motion vector to be used as candidate vector.

Preferred embodiments of the present invention are the subject-matter of the dependent claims.

Figure 2:
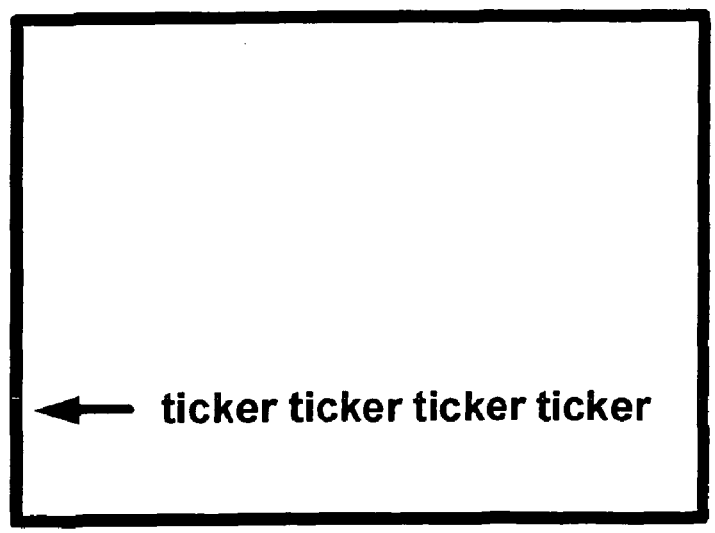
Figure 3:
Figure 4:
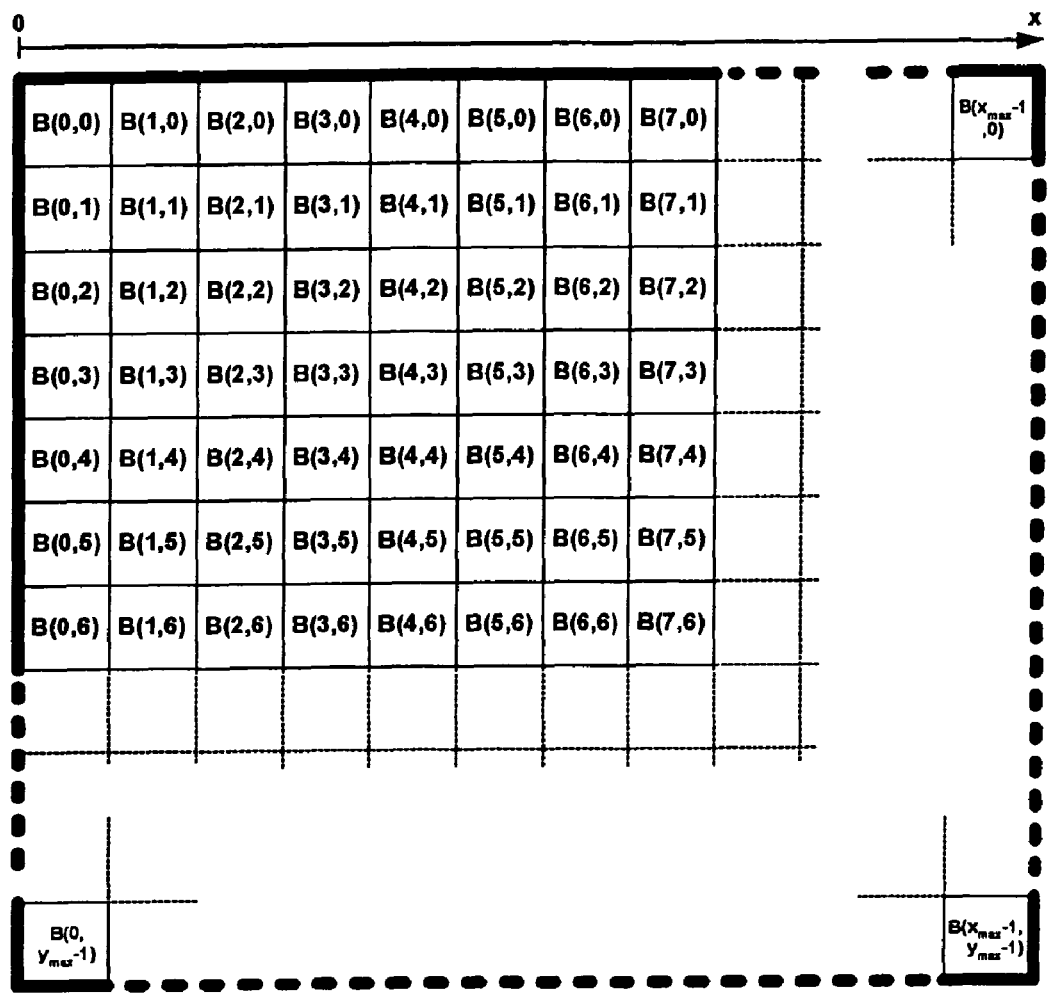
Figure 5:
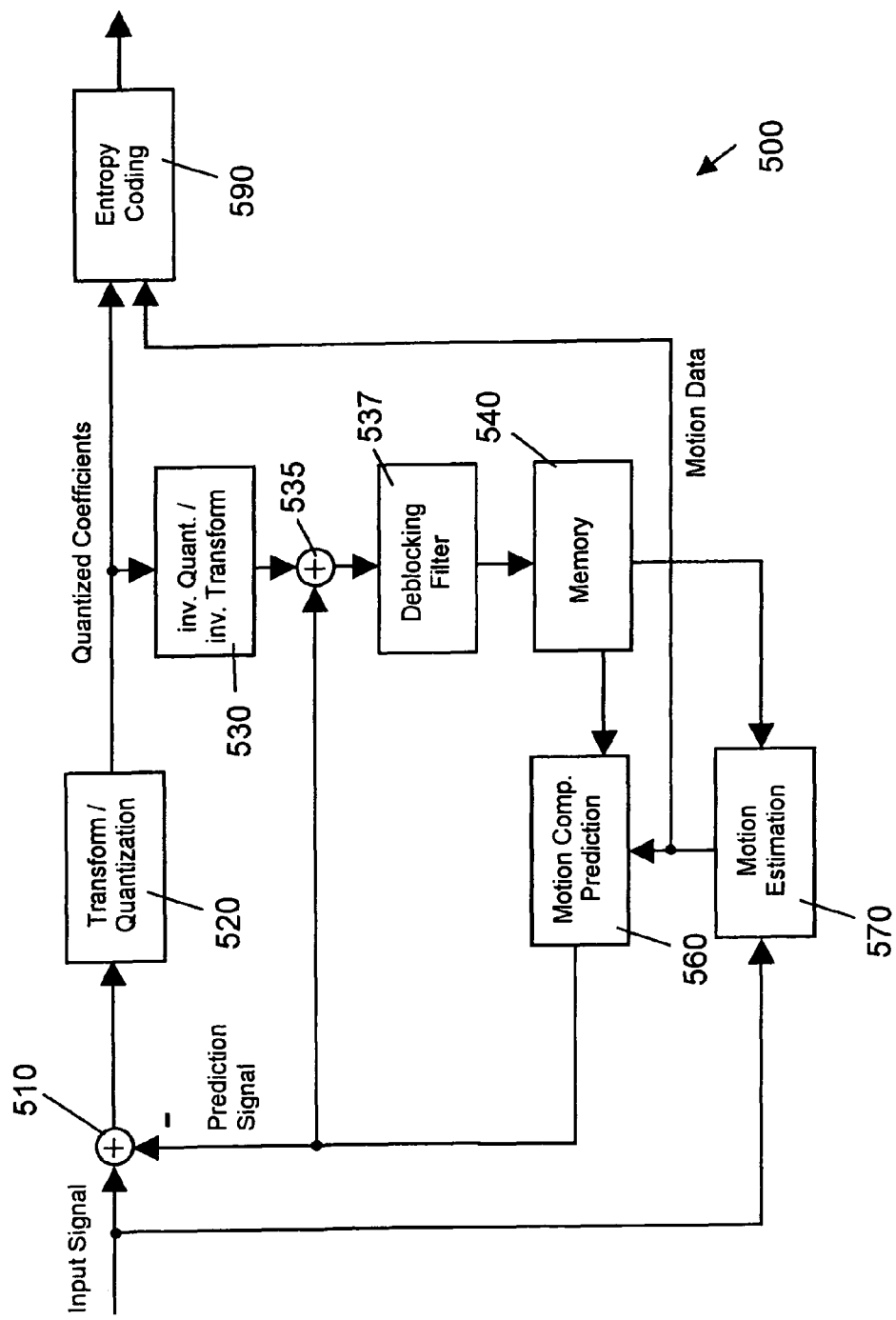
Figure 6:
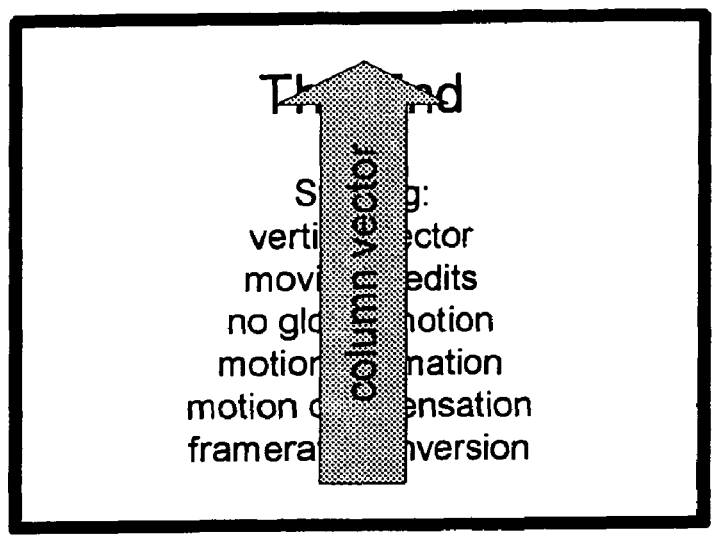
Figure 7:
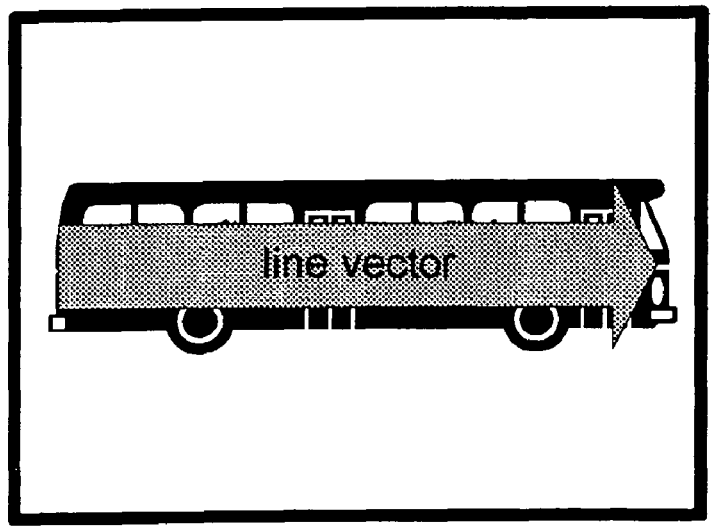

Other embodiments and advantages of the present invention will become more apparent form the following description of preferred embodiments, in which:

FIG. 1 illustrates an example video image including a large moving object,

FIG. 2 illustrates an example video image having a horizontally moving ticker area overlaid on the video content, FIG. 3 illustrates an example of a video image including vertically moving text, FIG. 4 illustrates the division of a video image into a plurality of blocks of a predefined size for motion estimation and compensation purposes, FIG. 5 illustrates an example configuration of a hybrid video encoder including motion estimation, FIG. 6 illustrates a column motion vector indicating predominant motion of the central columns of blocks in the video image of FIG. 3, and FIG. 7 illustrates a line motion vector indicating predominant motion of the central lines of blocks in the video image of FIG. 1.

The present invention relates to digital signal processing, especially to signal processing in modern television receivers. Modern television receivers employ up-conversion algorithms in order to increase the reproduced picture quality. For this purpose, intermediate images are to be generated from two subsequent images. For generating an intermediate image, the motion of moving objects has to be taken into account in order to appropriately adapt the object position to the point of time reflected by the interpolated image.

Motion estimation is performed on a block basis. For this purpose, each received image is divided into a plurality of blocks as illustrated, for example, in FIG. 4. Each current block is individually subjected to motion estimation by determining a best matching block in the previous image.

In order to avoid a time consuming full search within a predefined search area, only a limited set of candidate vectors are provided to the motion estimator. From these candidate vectors, the motion estimator selects that vector which can predict the current block from the respective block of the previous image with a minimum amount of deviations.

FIG. 4 illustrates the division of each video image into a plurality of blocks $B(x;y)$. Each block has a width X and a height Y wherein X and Y represent the number of pixels in the line and column direction, respectively. The number of blocks per line or column can be calculated by employing the following formulas:

$$x_{max} = \text{Pixels per line}/X$$

$$y_{max} = \text{Pixels per column}/Y$$

For each of these blocks, a motion vector is calculated from a plurality of different candidate vectors. Conventionally, the set of candidate vectors includes for instance the following motion vectors:

$$C_1 = (0;0)$$

$$C_2 = \vec{v}\,[(x-1;y),n]$$

$$C_3 = \vec{v}\,[(x;y-1),n]$$

$$C_4 = \vec{v}\,[(x-1;y),n] + \vec{u}$$

$$C_5 = \vec{v}\,[(x;y-1),n] + \vec{u}$$

$$C_6 = \vec{v}\,[(x+2;y),n-1]$$

$$C_7 = \vec{v}\,[(x;y+2),n-1]$$

wherein n indicates the current field, n−1 indicates the previous field, and $\vec{u}$ represents the update vector.

As can be seen from the above equations, the candidate vectors may include a zero motion vector ($C_1$), motion vectors of adjacent blocks for a spatial prediction ($C_2$, $C_3$), and/or a motion vector of the previous image for a temporal prediction ($C_6$, $C_7$).

The spatial prediction can be improved by employing update vectors which are accumulated to the spatial prediction vectors $C_2$, $C_3$. In order to take small changes of the object motion compared to a selected candidate vector into account, an update vector is applied to a motion vector to create new candidate vectors $C_4$, $C_5$. Although in the above list of candidate vectors, the update vector $\vec{u}$ is only applied to candidate vectors $C_2$ and $C_3$, it may be applied in the same manner to any other candidate vector, for instance to candidate vectors $C_6$, $C_7$.

Although the temporal prediction vectors $C_6$ and $C_7$ of the above list define the use of candidate vectors having an offset of two blocks, any other offset may be employed instead of two, for instance zero, one, three, etc.

While the temporal prediction vectors have been described with respect to a current and previous image, the term "image" may either relate to fields of an interlaced video sequence or to frames of a progressive video sequence. Correspondingly, the generated intermediate images may be fields or frames depending on the type of video sequence.

Further, the above list of candidate vectors is neither completed nor requires the inclusion of all of the above mentioned candidate vectors. Any other set of candidate vectors may be employed yielding the determination of a best match motion vector for the current block.

For each candidate vector, a prediction error is calculated and evaluated in order to determine the best match motion vector. As a measure for the prediction error, the Sum of Absolute Differences (SAD) can be determined. The candidate vector with the smallest SAD is considered to best represent the motion of the block and is selected.

As some of the motion vector candidates $C_1$ to $C_7$ may be preferred over other candidate vectors, a programmable "penalty" may be added to the determined SAD for individual candidates. In this manner, the selection of particular candidates can be prioritized. Preferably, the penalty value is proportional to the length of the update vector $\vec{u}$ for motion vector candidates $C_4$, $C_5$.

In addition to the above list of candidate vectors, a global motion vector may be further taken into account. A global motion vector represents motion applicable to all blocks of the video image. Such motion vectors appropriately apply to a camera pan.

While the above listed candidate vectors $C_1$ to $C_7$ represent motion vectors on a block basis, a global motion vector only applies to the complete image. Large objects within the image covering a plurality of blocks are neither appropriately represented by motion estimation on a single block basis nor by global motion estimation. While global motion estimation is only applicable if all of the blocks are affected of by a uniform motion, the motion of individual blocks is only calculated based on a small number of pixels. Consequently, the calculated motion vector may considerably differ due to the overlaid noise adversely affecting an accurate motion vector determination for a single block.

The present invention provides a better approach for determining a reliable motion vector by improving the motion estimation accuracy of large moving objects. Examples of such objects are illustrated in FIGS. 1, 2 and 3. FIG. 1 illustrates a moving object covering plural block lines within the image. FIG. 2 shows an example of separate text overlaid on the image content and moving independently therefrom. FIG. 3 depicts an example showing movie credits passing in vertical direction through the image. All of these examples relate to motion covering an image area much larger than an individual block, but not covering the complete image.

In order to be able to more accurately determine the uniform motion of all blocks of larger image areas, the present invention suggests additional candidate vectors $C_8$ and $C_9$ representing the motion of a complete line or column of blocks. In case of motion that occurs in a predominant number of blocks in a line or column, the line or column candidate vector corresponds to the motion of the largest object in this line or column. Due to the more accurate representation of motion for these blocks, the line or column candidate vector will be selected as the most appropriate motion estimation for these image areas. Individual blocks for which these candidate vectors do not apply, may select any of the other candidate vectors as their appropriate motion vector.

The candidate vectors introduced by the present invention can be expressed by the following formulas:

$$C_8 = \vec{v}_{line}[(y), n-1]$$

$$C_9 = \vec{v}_{column}[(x), n-1]$$

FIGS. 6 and 7 illustrate respective line and column motion vectors for the moving image content of FIGS. 1 and 3.

The calculation of a line or a column candidate vector $C_8$, $C_9$, will now be described in detail.

As soon as the motion vector determination for a current image n (field or frame) has been completed, the calculation of respective line and column vectors is started. The calculated line and column vectors are provided for use during motion estimation of the next field or frame.

First, motion vectors of a minor length are excluded from being taken into account. For this purpose, the motion vector $\vec{v}$ of each block is compared to a predefined threshold value $v_{thr}$. The result therefore is reflected in a binary "vecthr" flag assigned to each of the blocks. This flag is calculated as indicated by equation (1):

$$vecthr[(x, y), n] = \begin{cases} 1, \text{ if } (\vec{v}[(x, y), n] > \vec{v}_{thr}) \\ 0, \text{ else} \end{cases} \quad (1)$$

Preferably, the set of motion vectors determined for all blocks of image n is revised accordingly such that those motion vectors are set to zero (0;0) which do not exceed the predefined threshold value $v_{thr}$. This revision is reflected by equation (2):

$$\vec{v}_{thresholded}[(x, y), n] = \begin{cases} \vec{v}[(x, y), n], \text{ if } (vecthr[(x, y), n] > 0) \\ (0; 0), \text{ else} \end{cases} \quad (2)$$

In accordance with equation (2), a thresholded vector $\vec{v}_{thresholded}$ is calculated. The thresholded vector is set to zero if the previously calculated flag (cf. equation (1)) is zero. Otherwise, the determined vector $\vec{v}$ is assigned to the thresholded vector $\vec{v}$ thresholded.

For the calculation of a line or column vector, preferably a mean value of the non-zero thresholded vectors is calculated. However, a skilled person may apply any other algorithm in order to determine a motion vector representing a common motion vector for a plurality of individual motion vectors of a line or column.

For the line and column vector calculation, the individual block lengths and the number of blocks exceeding the threshold value $v_{thr}$ are accumulated as indicated by the following equations (3) to (6):

$$\vec{v}_{sum\_line}(y) = \sum_{x=0}^{x_{max}-1} \vec{v}_{thresholded}[(x, y), n] \quad (3)$$

$$\vec{v}_{sum\_column}(x) = \sum_{y=0}^{y_{max}-1} \vec{v}_{thresholded}[(x, y), n] \quad (4)$$

$$n_{sum\_line}(y) = \sum_{x=0}^{x_{max}-1} vecthr[(x, y), n] \quad (5)$$

$$n_{sum\_column}(x) = \sum_{y=0}^{y_{max}-1} vecthr[(x, y), n] \quad (6)$$

The line and column vectors $\vec{v}_{line}, \vec{v}_{column}$ are calculated in accordance with the following equations (7) and (8). A motion vector is only calculated if the number of blocks exceeding the predetermined threshold $v_{thr}$ for a line or column exceeds another predefined threshold $nthr_{line}, nthr_{column}$.

$$\vec{v}_{line}[(y), n] = \frac{\vec{v}_{sum\_line}(y)}{n_{sum\_line}(y)}, \text{ if } (n_{sum\_line}(y) > nthr_{line}) \quad (7)$$
$$(0; 0), \text{ else}$$

$$\vec{v}_{column}[(x), n] = \frac{\vec{v}_{sum\_column}(x)}{n_{sum\_column}(x)}, \text{ if } (n_{sum\_column}(x) > nthr_{column}) \quad (8)$$
$$(0; 0), \text{ else}$$

These calculated line and column vectors are used in the following field/frame as candidate vectors $C_8$ and $C_9$ during motion estimation.

Referring to the above-mentioned thresholds $v_{thr}$, $nthr_{line}$, $nthr_{column}$, preferably the following values are employed:

$\vec{v}_{thr}=4$ $nthr_{line}=x_{max}/2$ (45 for PAL standard and X=8)

$nthr_{column}=y_{max}/2$ (36 for PAL standard and Y=8)

wherein $x_{max}$ and $y_{max}$ represent the total width/height of a field or frame. The values are preferably employed for a block size of 8×8 pixels.

While the above description is based on the assumption that line and column vectors are calculated for each individual line and column, a common motion vector may additional or alternatively be calculated for combinations of two lines or two columns.

A two line or two column motion vector may further increase the motion accuracy for objects representing the predominant motion within two lines or two columns.

Hardware complexity may be reduced in avoiding any overlapping caused by the combination of plural lines or columns.

In the same manner, more than two lines and columns, for instance three, four or five, may be combined in order to provide a motion vector of increased accuracy for objects of a respective size.

While the threshold vector $v_{thr}$ has been described to be set uniformly for a line and column vector calculation, different thresholds may be employed for a line and a column. In addition, threshold vector $v_{thr}$ may be split into two different thresholds applicable for a horizontal motion vector component and a vertical motion vector component.

While the present invention has been previously described in the context of interpolation of intermediate images, in particular, for frame-rate conversion in modern television receivers, the improved motion estimation of the present invention may be applied in a corresponding manner to video data compression.

The compression of video data generally employs a number of main stages. Each individual image is divided into blocks of pixels in order to subject each image to a data compression at a block level. Such a block division may correspond to the division shown in FIG. 4. Spatial redundancies within an image are reduced by applying each block to a transform in order to transform the pixels of each block from the spatial domain into the frequency domain. The resulting transform coefficients are quantized, and the quantized transform coefficients are subjected to entropy coding.

Further, temporal dependencies between blocks of subsequent images are exploited in order to only transmit differences between subsequent images. This is accomplished by employing a motion estimation/compensation technique. The exploiting of temporal dependencies is performed by so-called hybrid coding techniques which combine temporal and spatial compression techniques together with statistical coding.

Referring to FIG. 5, an example of a hybrid video encoder is illustrated. The video encoder, generally denoted by reference number 500, comprises a subtractor 510 for determining differences between a current video image and a prediction signal of the current image which is based on a motion compensated previously encoded image. A transform and quantization unit 520 transforms the prediction error from the spatial domain into the frequency domain and quantizes the obtained transformed coefficients. An entropy encoding unit 590 entropy encodes the quantized transform coefficients.

Encoder 500 employs a Differential Pulse Code Modulation (DPCM) which only transmits differences between subsequent images of an input video sequence. These differences are determined by subtractor 510 which receives the video images to be encoded and a prediction signal to be subtracted therefrom.

The prediction signal is based on the decoding result of previously encoded images on the encoder site. This is accomplished by a decoding unit incorporated into the video encoder. The decoding unit performs the encoding steps in reverse manner. Inverse quantization and inverse transform unit 530 dequantizes the quantized coefficients and applies an inverse transform to the dequantized coefficients. Adder 535 accumulates the decoded differences and the prediction signal.

The prediction signal results from an estimation of motion between current and previous fields or frames. The motion estimation is performed by a motion estimator 570 receiving the current input signal and the locally decoded images. Motion estimation is preferably performed in accordance with the present invention. Based on the results of motion estimation, motion compensation is performed by motion compensator 560.

Summarizing, the present invention provides an improved method for motion estimation. As an additional candidate vector to be selected during motion estimation, a line or column vector is calculated representing predominant motion in a respective line or column of blocks of a video image. Such a line and column motion vector enables a more accurate determination of motion of larger image objects and a correspondingly improved interpolation in television receivers or video encoders.

The invention claimed is:

1. A method for determining a motion vector for a current block of a current image in a sequence of video images, each video image being divided into a plurality of blocks, said method comprising:
   determining, with a calculation unit, a line or column motion vector common to all blocks of a line or column of blocks in a previous image of the sequence of video images based on motion vectors of the blocks in the line or column of blocks, the line or column of blocks including a block located at a position corresponding to a position of the current block in the current image; and
   assigning, with a selector, the determined line or column motion vector common to all the blocks of the line or column of blocks in the previous image as the motion vector for the current block in the current image,
   wherein said determining the line or column motion vector only takes motion vectors of the blocks in the line or column of blocks of the previous image into account which exceed a predefined threshold value, and
   wherein said determining the line or column motion vector further comprises:
      comparing a motion vector of each of the blocks of the line or column of blocks in the previous image with the predefined threshold value;
      counting a number of compared motion vectors exceed the predefined threshold value;
      comparing the counted number of motion vectors exceeding the predefined threshold value with a predefined number; and
      determining the line or column motion vector only if the counted number of motion vectors does not fall below the predefined number.

2. The method of claim 1, wherein the predefined threshold value is set differently for the line motion vector and the column motion vector.

3. The method of claim 1, wherein the predefined threshold value corresponds to a length between ⅓ and ⅔ of a block length of a block in a direction of the line or column of blocks.

4. The method of claim 1, wherein the predefined threshold value corresponds to a length of essentially ½ of a block length of a block in a direction of the line or column of blocks.

5. The method of claim 1, wherein the predefined threshold is larger than or equal to 2 pixels.

6. The method of claim 5, wherein the predefined threshold is 4 pixels.

7. The method of claim 1, wherein the predefined number has a value between ¼ and ¾ of a total number of blocks in a direction of the line or column of blocks.

8. The method of claim 1, wherein the predefined number has a value of essentially ½ of a total number of blocks in a direction of the line or column of blocks.

9. The method of claim 1, wherein the predefined number has a value of 45 for a block length of 8 pixels in a direction of the line of blocks for an image in accordance with the PAL standard.

10. The method of claim 1, wherein the predefined number has a value of 36 for a block length of 8 pixels in a direction of the column of blocks for an image in accordance with the PAL standard.

11. The method of claim 1, wherein said assigning comprises assigning the motion vector for the current block from a plurality of candidate vectors, the plurality of candidate vectors comprising only the determined line or column motion vector and a limited set of candidate motion vectors from among a predefined search region.

12. The method of claim 11, wherein the plurality of candidate vectors further include the determined line motion vector and the determined column motion vector.

13. The method of claim 11, wherein the plurality of candidate vectors further include at least one of the following motion vectors:
   a zero motion vector pointing to an identical block position of the current block;
   a motion vector determined for an adjacent block in the current image;
   an updated motion vector determined for the adjacent block in the current image wherein a length of the motion vector determined for the adjacent block in the current image has been varied by adding an update vector; and
   a motion vector determined for a block of the previous image.

14. The method of claim 13, wherein the adjacent block of the current image is a block of a same column or line of blocks for which a motion vector has already been determined.

15. The method of claim 14, wherein the update vector adds an offset value to the determined motion vector, the offset value being a random or pseudo-random value.

16. The method of claim 15, wherein the offset value is sequentially provided from a sequence of pre-stored offset values.

17. The method of claim 1, wherein said determining the line or column motion vector common to all the blocks of the line or column of blocks is determined based on motion vectors of blocks in at least two adjacent lines or columns of the previous image.

18. The method of claim 11, wherein said assigning comprises:
   calculating a prediction error for each of the plurality of candidate motion vectors; and
   assigning a motion vector from the plurality of candidate motion vectors providing a smallest of the prediction errors as the motion vector for the current block.

19. A method of encoding a sequence of video images including motion compensation comprising the method for determining the motion vector for the current block of the current image in the sequence of video images of claim 1.

20. A method of interpolating a sequence of video images including motion compensation comprising the method for determining the motion vector for the current block of the current image in the sequence of video images of claim 1.

21. A motion estimator for determining a motion vector for a current block of a current image in a sequence of video images, each video image being divided into a plurality of blocks, said motion estimator comprising:
   a calculation unit for determining a line or column motion vector common to all blocks of a line or column of blocks in a previous image of the sequence of video images based on motion vectors of the blocks in the line or column of blocks, the line or column of blocks including a block located at a position corresponding to a position of the current block in the current image; and a selector for assigning the determined line or column motion vector common to all the blocks of the line or column of blocks in the previous image as the motion vector for the current block in the current image, wherein said calculation unit is adapted to determine the line or column motion vector only based on motion vectors of the blocks in the line or column of blocks of the previous image which exceed a predefined threshold value, and wherein said calculation unit is adapted to determine the line or column motion vector only if a predefined number of motion vectors of the blocks of the line or column of blocks in the previous image exceed the predefined threshold value.

22. The motion estimator of claim 21, wherein the predefined threshold value is set differently for the line motion vector and the column motion vector.

23. The motion estimator of claim 21, wherein the predefined threshold value corresponds to a length between ⅓ and ⅔ of a block length of a block in a direction of the line or column of blocks.

24. The motion estimator of claim 21, wherein the predefined threshold value corresponds to a length of essentially ½ of a block length of a block in a direction of the line or column of blocks.

25. The motion estimator of claim 21, wherein the predefined threshold value is larger than or equal to 2 pixels.

26. The motion estimator of claim 25, wherein the predefined threshold value is 4 pixels.

27. The motion estimator of claim 21, wherein the predefined number has a value between ¼ and ¾ of a total number of blocks in a direction of the line or column of blocks.

28. The motion estimator of claim 21, wherein the predefined number has a value of essentially ½ of a total number of blocks in a direction of the line or column of blocks.

29. The motion estimator of claim 21, wherein the predefined number has a value of 45 for a block length of 8 pixels in a direction of the line of blocks for an image in accordance with the PAL standard.

30. The motion estimator of claim 21, wherein the predefined number has a value of 36 for a block length of 8 pixels in a direction of the column of blocks for an image in accordance with the PAL standard.

31. The motion estimator of claim 21, wherein said selector receives a plurality of candidate vectors for assigning the motion vector of the current block therefrom, the plurality of candidate vectors comprising only the determined line or column motion vector and a limited set of candidate motion vectors from among a predefined search region.

32. The motion estimator of claim 31, wherein the plurality of candidate vectors further include the determined line motion vector and the determined column motion vector.

33. The motion estimator of claim 31, wherein the plurality of candidate vectors further include at least one of the following motion vectors:
 a zero motion vector pointing to an identical block position of the current block;
 a motion vector determined for an adjacent block in the current image;
 an updated motion vector determined for the adjacent block in the current image wherein a length of the motion vector determined for the adjacent block in the current image has been varied by adding an update vector; and
 a motion vector determined for a block of the previous image.

34. The motion estimator of claim 33, wherein the adjacent block of the current image is a block of a same column or line of blocks for which a motion vector has already been determined.

35. The motion estimator of claim 34, wherein the update vector adds an offset value to the determined motion vector, the offset value being a random or pseudo-random value.

36. The motion estimator of claim 35, further comprising a memory storing a sequence of offset values from which the offset value is sequentially provided.

37. The motion estimator of claim 21, wherein said calculation unit determines the line or column motion vector common to all the blocks of the line or column of blocks based on motion vectors of blocks in at least two adjacent lines or columns of the previous image.

38. The motion estimator of claim 31, wherein said selector comprises:
 a processing unit for calculating a prediction error for each of the plurality of candidate motion vectors;
 a comparator for comparing the calculated prediction errors and determining a smallest of the prediction errors; and
 a selection unit for assigning a motion vector from the plurality of candidate motion vectors providing the smallest prediction error as the motion vector for the current block.

39. An encoder for encoding a sequence of video images including motion compensation comprising the motion estimator of claim 21.

40. An interpolator for interpolating a sequence of video images including motion compensation comprising the motion estimator of claim 21.

* * * * *